(12) United States Patent
Soukhman et al.

(10) Patent No.: US 11,016,884 B2
(45) Date of Patent: May 25, 2021

(54) VIRTUAL BLOCK REDIRECTION CLEAN-UP

(71) Applicant: EMC IP Holding Company LLC, Hopkinton, MA (US)

(72) Inventors: Alex Soukhman, Raanana (IL); Vladimir Shveidel, Pardes-Hana (IL); Ronen Gazit, Tel Aviv (IL); Uri Shabi, Tel Mond (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 178 days.

(21) Appl. No.: 16/508,472

(22) Filed: Jul. 11, 2019

(65) Prior Publication Data

US 2021/0011667 A1   Jan. 14, 2021

(51) Int. Cl.
*G06F 12/02* (2006.01)
*G06F 3/06* (2006.01)

(52) U.S. Cl.
CPC ........ *G06F 12/0292* (2013.01); *G06F 3/0608* (2013.01); *G06F 3/0652* (2013.01); *G06F 3/0665* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 5,937,435 A | 8/1999 | Dobbek et al. | |
| 7,801,993 B2 | 9/2010 | Shitomi | |
| 8,019,925 B1 | 9/2011 | Vogan et al. | |
| 8,117,418 B1 * | 2/2012 | Metcalf | G06F 9/52 711/203 |
| 8,443,167 B1 | 5/2013 | Fallone et al. | |
| 8,578,122 B2 | 11/2013 | Coker et al. | |
| 8,629,928 B1 | 1/2014 | Koifman | |
| 8,977,662 B1 | 3/2015 | Hilliar | |
| 10,318,169 B2 | 6/2019 | Dalmatov et al. | |

* cited by examiner

*Primary Examiner* — Charles J Choi
(74) *Attorney, Agent, or Firm* — BainwoodHuang

(57) ABSTRACT

Virtual block redirection clean-up is accomplished for a virtual block in a mapper tree for a logical volume that is redirected to a destination virtual block in the mapper tree. In response to redirection of the virtual block, a redirection notification is sent to each component in a set of dependent components. Each dependent component may store one or more pointers to pointers located within virtual blocks of the mapper tree. The redirected virtual block is cleaned up in response to determining that each dependent component has expressly indicated, in response to the redirection notification, that it does not store any pointer to any pointer that is located within the redirected virtual block.

20 Claims, 10 Drawing Sheets

VIRTUAL BLOCK REDIRECTION CLEAN-UP

TECHNICAL FIELD

The disclosed technology relates generally to mapping a logical address space of a logical volume to physical pages of non-volatile data storage using a mapper tree, and more specifically to technology for cleaning up redirected virtual blocks in a mapper tree while guaranteeing referential consistency with one or more potentially dependent components.

BACKGROUND

Data storage systems are arrangements of hardware and software that include non-volatile data storage devices (e.g. electronic flash drives, magnetic disk drives, and/or optical drives) that are used to provide non-volatile storage for processing I/O (Input/Output) requests (i.e. writes and/or reads) that are received from one or more hosts (e.g. host computers). The host I/O requests that are processed by a data storage system may include block I/O requests as well as file I/O requests. The host I/O requests indicate host data that is stored in logical volumes of non-volatile data storage that are contained in and maintained by the data storage system. The data storage system performs various data storage services that organize and secure host data received from host computers on the non-volatile data storage devices of the data storage system.

SUMMARY

When processing a host I/O request, a data storage system may access a logical volume of non-volatile data storage hosted within the data storage system. The logical volume may, for example, be used to store host data indicated by one or more write requests and provide access to previously stored host data in response to one or more read requests. The data storage system may determine the location of the specific physical non-volatile storage that is mapped to a portion of the logical address space of a logical volume that is accessed by a read or write host I/O request by traversing a data structure sometimes referred to as a "mapper tree" that is stored in the metadata of the logical volume. For example, a data storage system may use the mapper tree to represent mappings between specific logical block addresses (LBAs) within a logical address space of the logical volume and corresponding physical pages of non-volatile data storage used to store host data written to those LBAs. Processing of each host I/O request that is directed to a logical volume may include a traversal of the logical volume's mapper tree in order to identify the physical page of non-volatile storage that corresponds to the LBA within the logical address space of the logical volume that is indicated by the host I/O request. The mapper tree may consist of or include a tree structure having multiple levels of nodes, including upper levels 1, 2, etc., a leaf level under the upper levels, a virtual block layer under the leaf level, and a physical block layer under the virtual block layer. Each node above the physical block layer may contain a maximum of N pointers to next lower level nodes, as follows:

Level 1: The top level, in which each node may contain a maximum of N pointers to Level 2 nodes.

Level 2: The next lower level after Level 1, in which each node may contain a maximum of N pointers to nodes in a next lower level.

... {other upper levels} ...

Leaf Level: The level below the upper levels. The leaf level contains leaf nodes. Each leaf node maps a corresponding segment within the logical address space of the logical volume (e.g. a range of LBAs) to pointers in virtual blocks in a virtual block layer, and may contain a maximum of N pointers that each indicate a pointer contained in a virtual block within the Virtual Block Layer.

Virtual Block Layer: The level below the Leaf Level, containing virtual blocks that isolate LBAs in the logical volume's logical address space from pages of physical non-volatile data storage. Each virtual block in the virtual block layer corresponds to a physical block of contiguous non-volatile data storage, and may contain up to a maximum of N pointers to individual physical pages of non-volatile data storage within the corresponding physical block.

Physical Block Layer: The level below the Virtual Block Layer, containing physical blocks. Each physical block is a physically contiguous chunk of non-volatile data storage that may be used to store host data, and is made up of pages that may be indicated by pointers contained in the corresponding virtual block.

For example, each physical page may be 4 kilobytes (KBs), each physical block may be 2 megabytes (MBs), and N may equal 512. In such an example, i) each leaf node may map 512 LBAs in a contiguous 2 megabyte (MB) segment of the logical address space of the logical volume using 512 pointers to pointers contained in virtual blocks, and ii) each virtual block may contain up to 512 pointers to 4 KB pages of non-volatile storage in a corresponding physical block. In some embodiments, each individual leaf node may be added to the mapping tree only in response to processing the first write operation that results in an access to the corresponding 2 MB segment of the logical address space of the logical volume, etc. Those skilled in the art will recognize that the sizes given in the above example are only for purposes of explanation, and that the techniques described herein are not limited to any specific set of sizes.

The virtual blocks in the virtual block layer may advantageously be used to support data deduplication. For example, after completion of a first write request to an LBA, a leaf node corresponding to the range of LBAs containing the LBA indicated by the first write request stores a pointer to a pointer in a virtual block, and the pointer in the virtual block indicates a physical page of non-volatile data storage in which the host data indicated by the write request was stored. A deduplication component may generate a digest from the host data indicated by the first write request (e.g. by application of a hash function to the host data), and stores the digest in association with a pointer to the pointer indicating the physical page of non-volatile data storage in which the host data indicated by the first write request was stored. For example, the deduplication component may store the digest together with the pointer to the pointer indicating the physical page in which the host data was stored in a row of a look-up table having a separate row for each previously generated digest. The initial write of the host data may cause the deduplication component to also increment a reference count for the pointer indicating the physical page in which the host data was stored. The reference count for the pointer to the physical page of non-volatile data storage in which the host data indicated by the first write was stored may be maintained in the virtual block that contains the pointer to the physical page of non-volatile data storage in which the host data indicated by the first write was stored. When a second write request is received, the deduplication component may then generates a digest for the host data to be written by the second write request, and compare that digest with the previously stored digest that was generated for the host data written by the first write request. In the case where the two digests match, the deduplication component may determine that the host data to be written by the second write request is identical to the host data previously stored by the first write request. Accordingly, instead of storing the identical data again into the physical non-volatile data storage, the data deduplication component may perform a deduplication operation that causes the leaf node corresponding to the range of LBAs containing the LBA indicated by the second write request to store a pointer to the same pointer that indicates the physical page of non-volatile data storage in which the host data indicated the first host write request was previously stored. The deduplication operation may also cause the reference count for the pointer to the physical page of non-volatile data storage in which the host data indicated by the first write was stored to be incremented again. Since the deduplication component may cause multiple leaf node pointers to indicate each pointer in a virtual block, each virtual block contains an independent reference count for each one of the pointers it contains. The reference count for a given pointer within a virtual block stores the total number of pointers in leaf nodes that point to that individual pointer.

Data fragmentation within physical blocks arises when physical blocks contain significant amounts of free space that is not being used to store host data. In response to detecting data fragmentation, physical block defragmentation may be performed to consolidate host data and create one or more completely unused physical blocks. Physical block defragmentation is performed by first identifying physical blocks having significant amounts of free space. The pages of host data previously stored within the physical blocks having significant amounts of free space are then moved to a single physical block, thus advantageously creating one or more completely unused physical blocks. For example, host data from a first physical block that is only 30% full may be combined with host data from a second physical block that is only 70% full in a third physical block that is then 100% full, in order to create two completely unused physical blocks (i.e. the first and second physical blocks).

When the above described physical block defragmentation is performed that moves host data from a first physical block and a second physical block into a third physical block, the pointers in a first virtual block corresponding to the first physical block, and the pointers in a second virtual block corresponding to the second physical block, that previously pointed to physical pages storing the host data in the first physical block and the second physical block, become invalid. Accordingly, in response to the above described physical block defragmentation, the first virtual block and the second virtual block are redirected to a third virtual block that corresponds to the third physical block. The third virtual block contains valid pointers to the host data in its new locations within the third physical block. Redirecting the first virtual block and the second virtual block to the third virtual block may include storing redirection information within the first virtual block and within the second virtual block that is used when the mapper tree is traversed to leaf node pointers that still point to the pointers in the first virtual block and the second virtual block that indicated the locations in the first physical block and the second block at which the host data was previously stored. The redirection information stored in the redirected first virtual block and the redirected second virtual block may include i) an indication of the destination virtual block to which the virtual block has been redirected (e.g. the third virtual block), and ii) an offset into the destination virtual block at which valid pointers are stored to physical pages in which the host data is now stored. For example, the redirection information stored into the first virtual block when the first virtual block is redirected to the third virtual block may include an identifier of the third virtual block and an offset into the third virtual block at which are located the pointers to physical pages in the third physical block that now store the host data that was previously stored in pages of the first physical block. Similarly, the redirection information stored into the second virtual block when the second virtual block is redirected to the third virtual block may include an identifier of the third virtual block and an offset into the third virtual block at which are located pointers to physical pages in the third physical block that now store the host data that was previously stored in pages of the second physical block.

Redirection information may be stored in a redirected virtual block for as long as that virtual block is redirected. For example, as long as at least one pointer in a leaf node exists that indicates a pointer in a redirected virtual block, the redirected virtual block must remain redirected, and the redirection information must be maintained in the virtual block. Significantly, pointers indicating the pointers contained in redirected virtual blocks are not only stored in leaf nodes. Various components in the data storage system are also potentially dependent on the redirection information in redirected virtual blocks, e.g. because they may store pointers to pointers contained in the redirected virtual blocks. For example, the rows in a look-up table used by a deduplicating component may store pointers to pointers contained in a redirected virtual block. A virtual block that has been redirected must stay redirected, and continue to store valid redirection information, as long as such potentially dependent components might store pointers to the pointers contained in the redirected virtual block. However, keeping a virtual block in the redirected state for a long time period, and storing a set of redirection information in the virtual block, is inefficient i) because traversing the redirected virtual block to find pointers to a valid pointer to a physical page requires traversing at least both the redirected virtual block and the destination virtual block, and ii) because the redirected virtual block cannot be re-used for another redirection until the current redirection information is no longer needed.

To address the above described and other technical problems, the disclosed technology promptly and safely cleans up redirected virtual blocks after they are redirected, such that redirection information is removed from a redirected virtual block only after any potentially dependent components within the data storage system no longer need the redirection information.

In the disclosed technology, in response to a virtual block in a mapper tree for a logical volume being redirected to a destination virtual block in the mapper tree, a redirection notification is sent to each component in a set of dependent components. Each dependent component stores one or more pointers to pointers located within virtual blocks of the mapper tree. The redirected virtual block is cleaned up in response to determining that each dependent component has expressly indicated, in response to the redirection notification, that it does not store any pointer to any pointer that is located within the redirected virtual block.

In some embodiments, the redirection notification identifies both the redirected virtual block and the destination virtual block, and receipt of the redirection notification by each dependent component causes the dependent component to replace at least one previously stored pointer to a pointer located within the redirected virtual block with a pointer to a pointer located within the destination virtual block.

In some embodiments, determining that each dependent component has indicated that it does not store any pointer to any pointer located within the redirected virtual block consists of or includes receiving an acknowledgement to the redirection notification from each dependent component indicating that the dependent component has replaced all pointers to pointers located within the redirected virtual block that were previously stored by the dependent component with pointers to pointers located within the destination virtual block.

In some embodiments, redirecting the virtual block consists of or includes adding redirection information to the virtual block indicating the destination virtual block, and cleaning up the redirected virtual block consists of or includes deleting the redirection information from the redirected virtual block.

In some embodiments, the redirection information may further include an offset into the destination virtual block at which are stored, within the destination virtual block, pointers to pages located in a physical block corresponding to the destination virtual block, and the pages located in the physical block corresponding to the destination virtual block store host data that was previously moved from physical pages located in a physical block corresponding to the redirected virtual block.

In some embodiments, in response to the redirection of the virtual block, a total number of dependent components in the set of dependent components may be added to a total references counter for the redirected virtual block. The total references counter may then be decremented at least in response to receipt of each acknowledgement to the redirection notification, and determining that each dependent component has indicated that it does not store any pointer to any pointer located within the redirected virtual block may consist of or include detecting that the total references counter for the redirected virtual block has a value of zero.

In some embodiments, a total number of pointers stored in leaf nodes of the mapper tree that point to pointers located within a redirected virtual block may be added to the total references counter for the virtual block. The total references counter for the virtual block may then also be decremented each time a pointer in a leaf node of the mapper tree that points to a pointer that is located within the redirected virtual block is replaced with a pointer to a pointer that is located within the destination virtual block.

In some embodiments, replacing pointers in leaf nodes of the mapper tree that point to pointers located within the redirected virtual block with pointers to pointers located within the destination virtual block may be performed while traversing the mapper tree to process reads of the logical volume.

In some embodiments, replacing pointers in leaf nodes of the mapper tree that point to pointers located within the redirected virtual block with pointers to pointers located within the destination virtual block may be performed by a background process.

In some embodiments, in response to redirection of the virtual block, all bits in a bit map may be set. The bit map may include a bit corresponding to each one of the dependent components in the set of dependent components. Individual bits in the bit map corresponding to dependent components in the set of dependent components may be cleared in response to receipt of acknowledgements to the redirection notification from the corresponding dependent components. Determining that each dependent component has indicated that it does not store any pointer to any pointer located within the redirected virtual block may then consist of or include detecting that all bits in the bit map have been cleared.

In some embodiments, the virtual block may be redirected in response to host data being moved from at least one page in a physical block corresponding to the redirected virtual block to at least one page in a physical block corresponding to the destination virtual block by a defragmentation component.

Embodiments of the disclosed technology may provide significant improvements over previous technologies. For example, embodiments of the disclosed technology may enable redirected virtual blocks to be cleaned up promptly after they are redirected, thus reducing the time that redirected virtual blocks must be traversed within the mapper tree. In addition, the disclosed technology may operate such that redirection information is removed from a redirected virtual block only after it has confirmed any components within the data storage system that potentially need the redirection information to find the destination virtual block have confirmed that they do not store any pointers to pointers located within the redirected virtual block, and accordingly do not need the redirection information.

BRIEF DESCRIPTION OF THE DRAWINGS

The foregoing and other objects, features and advantages will be apparent from the following description of particular embodiments of the disclosed technology, as illustrated in the accompanying drawings in which like reference characters refer to the same parts throughout the different views. The drawings are not necessarily to scale, emphasis instead being placed on illustrating the principles of various embodiments of the disclosed technology.

DETAILED DESCRIPTION

Embodiments of the invention will now be described. The embodiments described herein are only examples of how features and principles of the invention may be embodied. The invention itself is accordingly broader than the specific examples described below.

The technology disclosed herein safely cleans up virtual block redirections of virtual blocks in a logical block address mapper tree for a logical volume that is hosted in a data storage system. In the disclosed technology, a virtual block in the mapper tree is redirected to a destination virtual block, e.g. in response to host data being relocated from a physical block corresponding to redirected virtual block to a physical block corresponding to the destination virtual block, as may occur, for example, during defragmentation of host data stored in the non-volatile data storage of the data storage system. In response to the redirection of the virtual block, the disclosed technology sends a redirection notification to each dependent component in a set of dependent components that execute in the data storage system. Each dependent component may depend on the virtual blocks of the mapper tree, in that the component may store one or more pointers to pointers located within the virtual blocks of the mapper tree. The set of dependent components may, for example, include a data deduplication component that stores pointers to pointers located in the virtual blocks of the mapper tree within a look-up table used to identify identical sets of host data when deduplicating host data. A redirected virtual block is subsequently cleaned up only in response to determining that each dependent component has expressly indicated, e.g. in an acknowledgement message generated in response to the redirection notification, that it does not currently store any pointer to any pointer that is located within the redirected virtual block. A total references counter and/or a bitmap may be maintained in the redirected virtual block to keep track of which dependent components have sent acknowledgements in response to the redirection notification. Clean-up of a redirected virtual block may include deleting redirection information that was stored in the redirected virtual block at the time that the virtual block was redirected.

Figure 1:
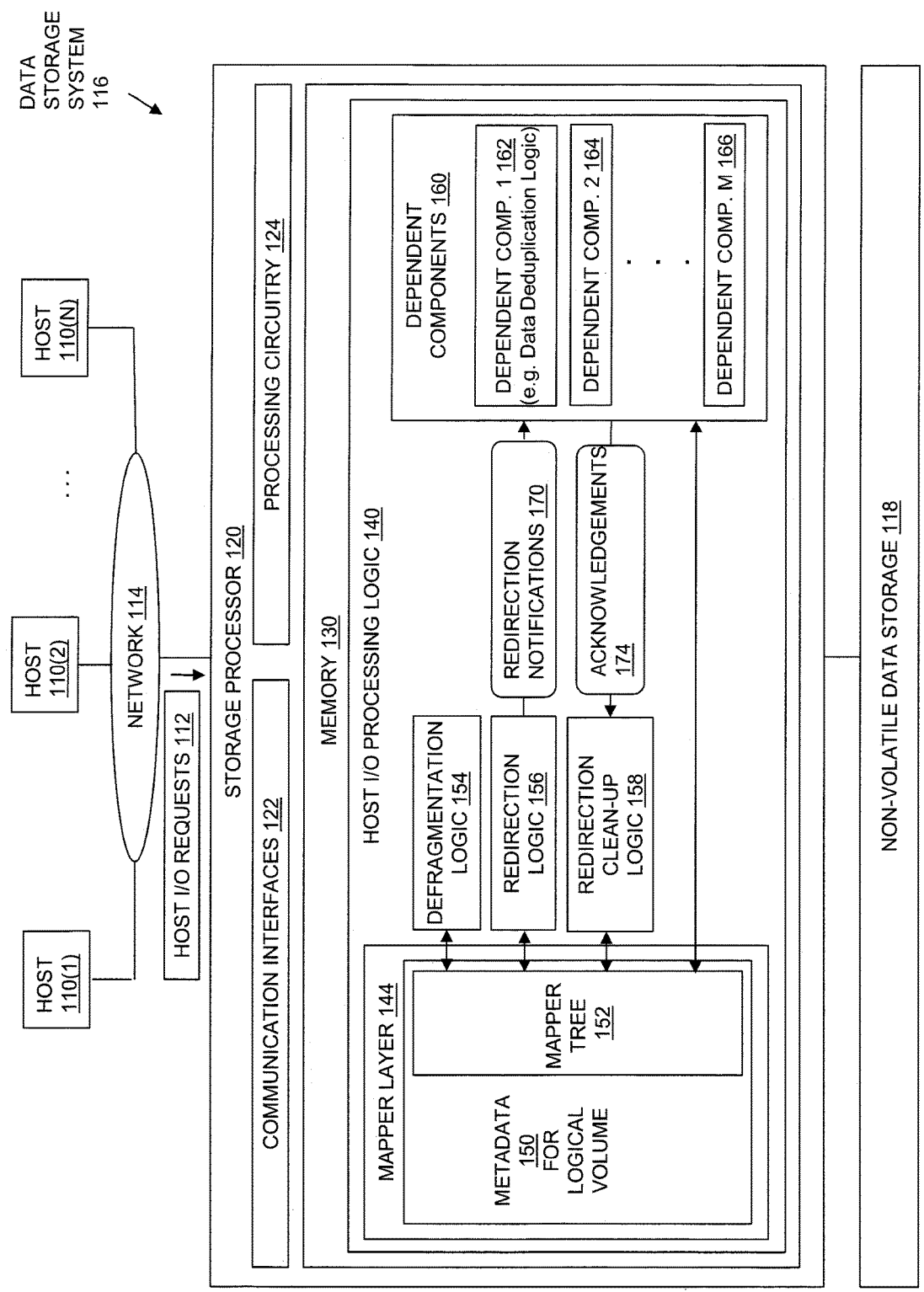
FIG. 1 is a block diagram showing an example of components in some embodiments and an operational environment.

FIG. 1 shows an example of an operational environment in which embodiments of the disclosed technology may operate, and an illustrative embodiment of the disclosed technology. As shown in FIG. 1, one or more host computers ("Hosts"), shown as host computers 110(1) through 110(N), and/or host applications executing in whole or in part on host computers 110(1) through 110(N), access non-volatile data storage provided by Data Storage System 116 over a Network 114. Data Storage System 116 includes at least one Storage Processor 120 and Non-Volatile Data Storage 118. Data Storage System 116 may include one or more storage processors like Storage Processor 120. In some embodiments, multiple storage processors may be provided as circuit board assemblies, or "blades," which plug into a chassis that encloses and cools the storage processor. Those skilled in the art will recognize, however, that no particular configuration of storage processors is required, as any number of storage processors, including a single storage processor, may be provided and that Storage Processor 120 may be any type of physical or virtual computing device that is capable of processing host I/O requests.

Non-Volatile Data Storage 118 may include or consist of some number of disk drives. The disk drives in Non-Volatile Data Storage 118 may include magnetic disk drives, electronic flash drives, optical drives, and/or other types of non-volatile data storage drives or devices. Non-Volatile Data Storage 118 may include some number of pages of non-volatile data storage. Each physical page of non-volatile data storage may have the same length, for example 4 KB.

Network 114 may include or consist of any type of network or combination of networks, such as, for example, a storage area network (SAN), a local area network (LAN), a wide area network (WAN), the Internet, and/or some other type of network or combination of networks.

Hosts 110(1-N) and/or host applications executing in whole or in part on Hosts 110(1-N) may logically connect to and communicate with the Storage Processor 120 using various technologies. For example, Host I/O Requests 112 conveyed from Hosts 110(1-N) to Storage Processor 120 may include block I/O requests (read requests and/or write requests) communicated from Hosts 110(1-N) to Storage Processor 120 using block storage interfaces and protocols such as, for example, the Small Computer System Interface (SCSI), Fibre Channel (FC), Serial Attached SCSI (SAS), Internet Small Computer System Interface (iSCSI), and/or other block storage interfaces and/or protocols. Host I/O Requests 112 conveyed from Hosts 110(1-N) to Storage Processor 120 may further include file I/O requests (read requests and/or write requests) communicated from Hosts 110(1-N) to the Storage Processor 120 using file storage interfaces and protocols such as, for example, the Network File System (NFS) distributed file system protocol, the Server Message Block (SMB)/Common Internet File System (CIFS) application-layer network protocol, Apple Filing Protocol (AFP), and/or other file storage interfaces and/or protocols. Storage Processor 120 may accordingly be configured to receive host I/O requests through block-based and/or file-based storage protocols, and to respond to host I/O requests of either type by reading or writing the Non-Volatile Data Storage 118.

Storage Processor 120 may include one or more Communication Interfaces 122, Processing Circuitry 124, and Memory 130. The Communication Interfaces 122 of Storage Processor 120 may include, for example, SCSI target adapters and/or network interface adapters that convert electronic and/or optical signals received over Network 114 into electronic form for use by Storage Processor 120.

Processing Circuitry 124 may be embodied as at least one processor core that is capable of independently reading and executing threads of program instructions as they are scheduled for execution. Processing Circuitry 124 may be integrated into a single central processing unit chip or chip package. Processing Circuitry 124 may be a subset of the processor cores contained in Storage Processor 120, or may be the only processor core contained in Storage Processor 120.

Memory 130 may include both volatile memory (e.g., RAM), and/or non-volatile memory (e.g. ROM, disk drives, solid state drives, portions of Non-Volatile Storage 118, etc.). Processing Circuitry 124 and Memory 130 together may form specialized control circuitry, which is constructed and arranged to carry out specific methods and functions as described herein. As shown in FIG. 1, Memory 130 stores specialized software components and data structures that may be provided at least in part in the form of executable program instructions. When the executable instructions of the software components shown in FIG. 1 are executed by Processing Circuitry 124, Processing Circuitry 124 performs the methods and functionality of the software. Although certain specific software constructs are shown in FIG. 1 and described herein, those skilled in the art will recognize that Memory 130 may further include various other types of software constructs, which are not shown.

In the example of FIG. 1, the software components in Memory 130 include Host I/O Processing Logic 140, which provides program logic for processing and/or supporting the processing of the Host I/O Requests 112 received by Storage Processor 120. Host I/O Requests 112 processed by Host I/O Processing Logic 140 may include host I/O requests (e.g. host I/O read requests, host I/O write requests) directed to various types of block data objects hosted by Data Storage System 116 using Non-Volatile Storage 118, such as logical disks (e.g. logical units sometimes referred to as LUNs) and/or block-based virtual volumes (VVols). Host I/O Requests 112 processed by Host I/O Processing Logic 140 may also or alternatively include host I/O requests (e.g. host I/O read requests, host I/O write requests) directed to file data objects hosted by Data Storage System 116 using Non-Volatile Storage 118, such as files or file systems.

During the processing of Host I/O Requests 112, Host I/O Processing Logic 140 creates at least one logical volume of non-volatile data storage from the Non-Volatile Data Storage 118, and then uses the logical volume to store host data indicated by and/or received in the Host I/O Requests 112 while processing Host I/O Requests 112. The logical volume created by Host I/O Processing Logic 140 may, for example, store one or more of the host accessible data objects that are hosted by Data Storage System 116.

For each logical volume created by Host I/O Processing Logic 140, Mapper Layer 144 creates metadata that is used by Host I/O Processing Logic 140 while processing host I/O requests resulting in accesses to that logical volume. FIG. 1 shows an example of Metadata 150 that is created and maintained by Mapper Layer 144 for a logical volume created by Host I/O Processing Logic 140. Metadata 150 includes a Mapper Tree 152. For each request in Host I/O Requests 112 that results in an access to the logical volume, Mapper Layer 144 traverses the Mapper Tree 152 based on a logical block address (LBA) indicated by the request within the logical address space of the logical volume to determine the location of the corresponding page of physical non-volatile data storage. Mapper Tree 152 accordingly maps individual LBAs within the logical address space of the logical volume to corresponding physical pages of non-volatile storage that are used to store host data written to the logical volume. In some embodiments, some or all of Mapper Tree 152 may be made up of or include a B-tree, which is an example of a self-balancing tree data structure.

Mapper Tree 152 may be embodied with multiple levels of nodes, including upper levels, a leaf level under the upper levels, a virtual block layer under the leaf level, and a physical block layer under the virtual block layer. Each node in Mapper Tree 152 above the physical block layer contains a maximum of N pointers to nodes located in a next lower level. For example, the upper levels of Mapper Tree 152 may include a top level ("Level 1"), in which each node contains a maximum of N pointers to nodes in the next lower level, e.g. "Level 2". Similarly, each node in "Level 2" of Mapper Tree 152 may contain a maximum of N pointers to nodes in "Level 3" of Mapper Tree 152, and so on for any further upper levels.

The level of nodes below the upper levels of Mapper Tree 152 is the leaf level. The leaf level of Mapper Tree 152 contains leaf nodes. Each leaf node in Mapper Tree 152 maps a corresponding segment within the logical address space of the logical volume (e.g. a range of LBAs) to pointers located in virtual blocks in the virtual block layer. Each leaf node may contain a maximum of N pointers, each of which points to a pointer that is located in a virtual block within the virtual block layer of Mapper Tree 152. Each virtual block in the virtual block layer of Mapper Tree 152 corresponds to a physical block of contiguous non-volatile data storage in Non-Volatile Data Storage 118, and may contain up to a maximum of N pointers to physical pages of non-volatile data storage located within the corresponding physical block. The physical block layer is located below the virtual block layer, and contains physical blocks, each of which corresponds to one of the virtual blocks in the virtual block layer. Each physical block is a physically contiguous chunk of non-volatile data storage in Non-Volatile Data Storage 118, and contains pages of non-volatile data storage in which host data may be stored, each of which may be indicated by a pointer contained in the corresponding virtual block.

In some embodiments, pointers to the pointers in the virtual blocks of the Mapper Tree 152 may also be stored by dependent components such as data deduplication logic. In the example of FIG. 1, one of the Dependent Components 160, e.g. Dependent Component 1 162, consists of or includes data deduplication logic. Data deduplication logic operates by detecting when host data that is being written by one of Host I/O Requests 112 is identical to host data that was previously stored in Non-Volatile Data Storage 118. In response to detecting a write of host data that is identical to previously stored host data, in order to conserve non-volatile data storage resources, and instead of simply storing another copy of the previously stored identical host data, the data deduplication logic stores, within a leaf node of the Mapper Tree 152, a pointer to a pointer in a virtual block. The pointer in the virtual block points to the physical page into which the identical host data was previously stored. For example, after completion of a first write to an LBA, a leaf node in Mapper Tree 152 corresponding to the range of LBAs containing that LBA stores a pointer to a pointer in a virtual block, and the pointer in the virtual block indicates the physical page of non-volatile data storage into which the data indicated by the first write was stored. The deduplication logic generates a digest from the host data indicated by the first write (e.g. by applying a hash function or the like to that host data), and then stores the digest in a row of a look-up table, together with a pointer to the pointer that points to the physical page of non-volatile data storage into which the host data was stored. The look-up table may be stored in or accessed by the deduplication logic in Memory 130, and may have a separate row for each digest, with the digests acting as look-up keys. When a second write of host data is received, the deduplication component generates a digest for the host data indicated by the second write, and compares that digest with all the previously stored digests in the look-up table. In response to determining that the digest generated for the host data of the second write matches the digest generated for the host data previously stored by the first write, the deduplication logic determines that the host data to be written by the second write is identical to the host data previously stored by the first write, and accordingly performs a deduplication operation that causes the leaf node corresponding to the range of LBAs containing the LBA indicated by the second write to store the pointer located in the row of the look-up table that stores the matching digest, i.e. the pointer to the pointer that points to the physical page of non-volatile data storage into which the identical host data was previously stored in response to the first write.

A reference count may be maintained for each pointer in each virtual block. The reference count for a given pointer within a virtual block has a value equal to the number of pointers in leaf nodes that point to that pointer. For example, the reference count for the pointer to the physical page of non-volatile data storage into which the host data indicated by the first write was stored may be contained in the virtual block that contains that pointer. The deduplication logic may increment the reference count for the pointer to the physical page of non-volatile data storage into which the host data indicated by the first write was stored both i) as a result of performing the first write when the host data was actually stored in non-volatile data storage, and ii) as a result of performing the second write, which only caused the leaf node corresponding to the range of LBAs containing the LBA indicated by the second write to store the pointer to the pointer that points to the physical page of non-volatile data storage into which the host data was previously stored when performing the first write.

Defragmentation Logic 154 detects data fragmentation within physical blocks in Mapper Tree 152, e.g. when physical blocks contain significant amounts of free space that is not being used to store host data. In response to detecting data fragmentation, Defragmentation Logic 154 may perform data defragmentation on the physical blocks identified as having significant free space, in order to consolidate host data and create one or more completely unused physical blocks. Defragmentation Logic 154 performs defragmentation by first identifying a specific set of physical blocks that have significant amounts of free space. Defragmentation Logic 154 then moves the previously stored host data from the identified set of physical blocks having significant amounts of free space to another physical block, to creating one or more completely unused physical blocks from the physical blocks identified as having significant amounts of free space.

For example, when Defragmentation Logic 154 performs data defragmentation that moves host data from a first physical block and a second physical block into a third physical block, the pointers in a first virtual block corresponding to the first physical block, that previously pointed to physical pages in the first physical block storing host data, and the pointers in a second virtual block corresponding to the second physical block, that previously pointed to physical pages in the second physical block storing host data, become invalid. In response to and/or as part of such a data defragmentation operation, Redirection Logic 156 redirects both the first virtual block and the second virtual block to a third virtual block that corresponds to the third physical block. The third virtual block contains valid pointers to the host data in its new locations within the third physical block. In this example, the third virtual block is the destination virtual block to which the first virtual block and the second virtual block are redirected. Redirection Logic 156 redirects the first virtual block and the second virtual block to the third virtual block at least in part by storing redirection information into the first virtual block and the second virtual block. The redirection information is used when Mapper Tree 152 is subsequently traversed through the leaf node pointers that still indicate the previously valid pointers in the first virtual block and the second virtual block that previously indicated the locations in the first physical block and the second block at which the host data was previously stored, but that are now invalid. The redirection information identifies the third virtual block as the destination virtual block for each of the redirected first virtual block and redirected second virtual block, and indicates at least one location within the destination virtual block, e.g. an offset within the third virtual block, at which valid pointers are stored to the locations of the host data within the third physical block. Accordingly, the redirection information stored in the redirected first virtual block and the redirected second virtual block may, for example, include i) an identifier of the destination virtual block to which the virtual block has been redirected (e.g. an identifier of the third virtual block), and ii) an offset into the destination virtual block at which valid pointers are stored to physical pages in which the host data is stored after defragmentation. For example, the redirection information stored into the first virtual block when the first virtual block is redirected to the third virtual block may include an identifier of the third virtual block and an offset into the third virtual block at which are located the pointers to physical pages in the third physical block that now store the host data that was previously stored in pages of the first physical block. Similarly, the redirection information stored into the second virtual block when the second virtual block is redirected to the third virtual block may include an identifier of the third virtual block and an offset into the third virtual block at which are located pointers to physical pages in the third physical block that now store the host data that was previously stored in pages of the second physical block.

Dependent Components 160 are a set of software components (e.g. Dependent Component 1 162, Dependent Component 2 164, and so on through Dependent Component M 166), that are each potentially dependent on the redirection information stored in redirected virtual blocks. Each one of Dependent Components 160 may store pointers to pointers contained in virtual blocks, e.g. pointers to pointers contained in one or more redirected virtual blocks. For example, in the case where Dependent Component 1 162 consists of or includes data deduplication logic, the data deduplication logic may store one or more pointers to pointers contained in one or more redirected virtual blocks within a look-up table or the like.

In order to safely clean up redirected virtual blocks soon after they are redirected, such that the redirection information is removed from a redirected virtual block only after none of the Dependent Components 160 continue to need the redirection information, Redirection Logic 156 may operate in response to redirection of a virtual block in Mapper Tree 152 by sending a redirection notification to each one of the dependent components in Dependent Components 160, as shown in FIG. 1 by Redirection Notifications 170. The redirected virtual block is only subsequently cleaned up by Redirection Clean-Up Logic 158 in response to Redirection Clean-Up Logic 158 determining that each one of the dependent components in Dependent Components 160 has expressly indicated, in response to the receipt of the redirection notification sent by Redirection Logic 156 when the virtual block was redirected, that it does not store any pointer to any pointer that is located within that redirected virtual block.

In some embodiments, the redirection notification sent by Redirection Logic 156 to each dependent component in Dependent Components 160 in response to redirection of a virtual block to a destination virtual block may identify both the redirected virtual block and the destination virtual block, e.g. by containing both an identifier of the redirected virtual block and an identifier of the destination virtual block. Receipt of the redirection notification by each dependent component in Dependent Components 160 may cause each dependent component in Dependent Components 160 to replace at least one previously stored pointer to a pointer located within the redirected virtual block with a pointer to a pointer located within the destination virtual block, e.g. within a look-up table or the like maintained by data deduplication logic.

In some embodiments, Redirection Clean-Up Logic 158 may determine that each dependent component in Dependent Components 160 has indicated that it does not store any pointer to any pointer located within the redirected virtual block at least in part by receiving an acknowledgement to the redirection notification from each dependent component in Dependent Components 160 indicating that the dependent component has replaced all pointers to pointers located within the redirected virtual block that were previously stored by the dependent component with pointers to pointers located within the destination virtual block. Such acknowledgements from dependent components in Dependent Components 160 are shown in FIG. 1 by Acknowledgements 174.

In some embodiments, the Redirection Logic 156 may redirect a virtual block to a destination virtual block at least in part by adding redirection information to the virtual block that indicates the destination virtual block. The indication of the destination virtual block in the redirection information added to the redirected virtual block may consist of or include an identifier of the destination virtual block. Redirection Clean-Up Logic 158 may clean up the redirected virtual block at least in part by deleting the redirection information from the redirected virtual block.

In some embodiments, the redirection information added by Redirection Logic 156 to a virtual block when the virtual block is redirected to a destination virtual block may further include an offset into the destination virtual block. The offset into the destination virtual block may indicate a location within the destination virtual block at which are stored pointers to pages located in a physical block corresponding to the destination virtual block that store host data that was previously moved to the pages located in the physical block corresponding to the destination virtual block from pages located in a physical block corresponding to the redirected virtual block, e.g. during data defragmentation.

In some embodiments, in response to the redirection of a virtual block, Redirection Logic 156 may add a total number of dependent components in the set of dependent components to a total references counter for the redirected virtual block that is contained in the redirected virtual block. The total references counter is then subsequently decremented by the Redirection Clean-Up Logic 158 at least in response to receipt of each one of the acknowledgements to the redirection notification received from the Dependent Components 160. Redirection Clean-Up Logic 158 may then determine that each dependent component in Dependent Components 160 has indicated that it does not store any pointer to any pointer located within a redirected virtual block when Redirection Clean-Up Logic 158 detects that the total references counter for the redirected virtual block has a value of zero.

In some embodiments, in response to the redirection of a virtual block, Redirection Logic 156 may also add a total number of pointers stored in leaf nodes of the Mapper Tree 152 that point to pointers located within the redirected virtual block to the total references counter for the virtual block. The total references counter for the redirected virtual block may then also be decremented (e.g. by Redirection Clean-Up Logic 158) each time a pointer in a leaf node of the mapper tree that points to a pointer that is located within the redirected virtual block is replaced with a pointer to a pointer that is located within the destination virtual block.

In some embodiments, Redirection Clean-Up Logic 158 may replace pointers in leaf nodes of the Mapper Tree 152 that point to pointers located within a redirected virtual block with pointers to pointers located within the destination virtual block for that redirected virtual block when the mapper tree is traversed to process reads of the logical volume.

In some embodiments, Redirection Clean-Up Logic 158 may replace pointers in leaf nodes of the Mapper Tree 152 that point to pointers located within redirected virtual blocks with pointers to pointers located within destination virtual blocks by executing a background process that searches through the leaf nodes of Mapper Tree 152 to locate pointers in leaf nodes of the Mapper Tree 152 that point to pointers located in redirected virtual blocks.

In some embodiments, in response to redirection of a virtual block, at the time a redirection notification is sent to each dependent component in Dependent Components 160, Redirection Logic 156 may set all the bits in a bit map. The bits in the bit map may include a bit corresponding to each one of the dependent components in Dependent Components 160. Individual bits in the bit map corresponding to dependent components in Dependent Components 160 may then be cleared by Redirection Clean-Up Logic 158 in response to receipt by Redirection Clean-Up Logic 158 of an acknowledgement to the redirection notification from the corresponding dependent component indicating that the dependent component does not store any pointers to pointers located within the redirected virtual block. Redirection Clean-Up Logic 158 may then determine that each dependent component has indicated that it does not store any pointer to any pointer located within the redirected virtual block by detecting that all bits in the bit map have been cleared.

In some embodiments, Redirection Logic 156 may redirect a virtual block in response to Defragmentation Logic 154 moving host data at least one page in a physical block corresponding to the redirected virtual block to at least one page in a physical block corresponding to the destination virtual block.

Figure 2:
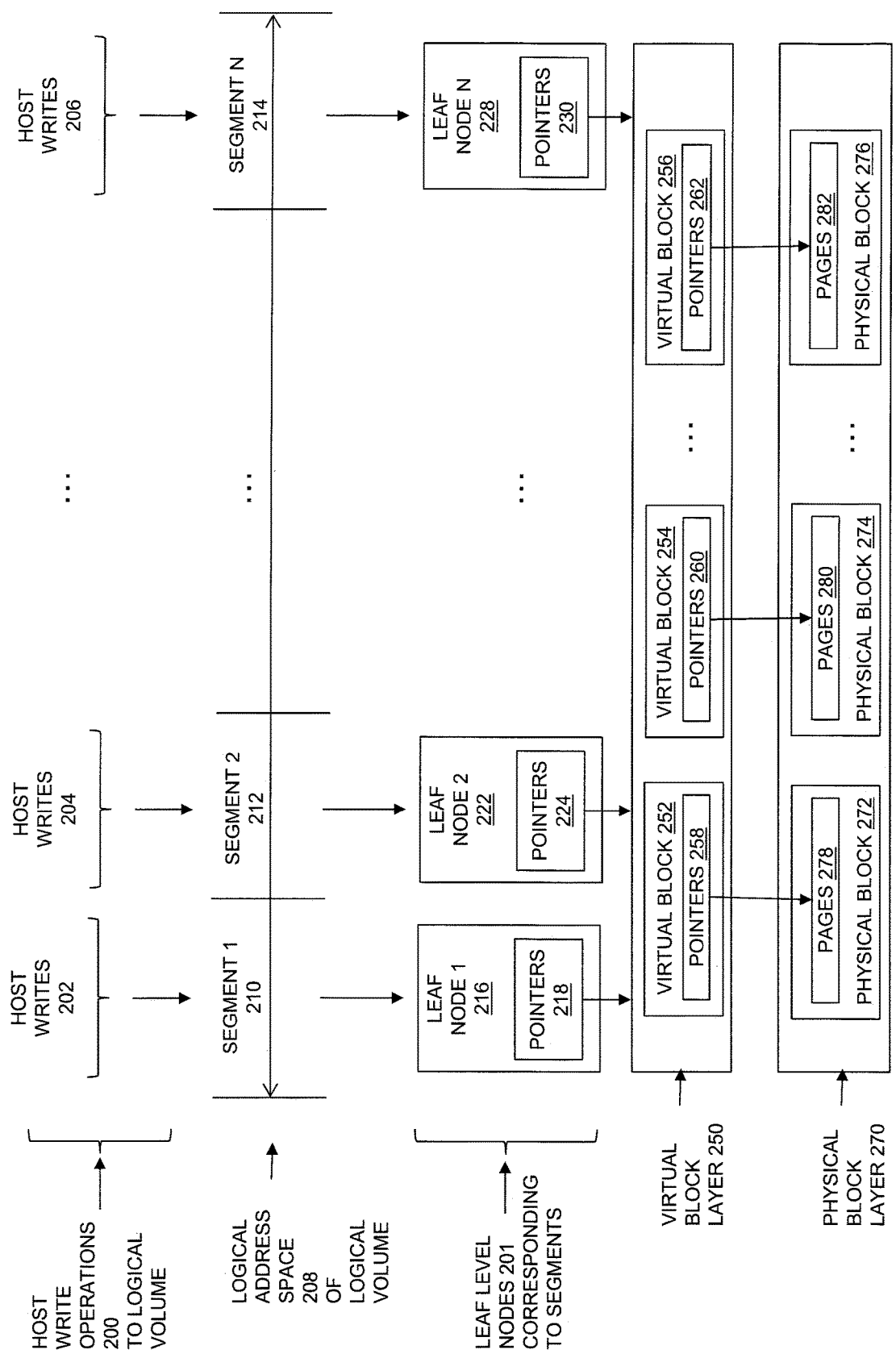
FIG. 2 is a block diagram showing an example of some components in a mapper tree for a logical volume in some embodiments.

FIG. 2 is a block diagram showing an example of segments in a Logical Address Space 208 of a logical volume, and of the corresponding Leaf Nodes 201 in a mapping tree for the logical volume. As shown in FIG. 2, Logical Address Space 208 may be divided into segments, shown by Segment 1 210, Segment 2 212, and so on through Segment N 214. The disclosed technology may be embodied using any specific length of logical address space, and various specific sizes of segments within the logical address space. For example, each segment within the Logical Address Space 208 may have a size of 2 MB. In such an example, each leaf node may store up to 512 pointers, each of which points to a pointer that points to a 4 KB page of non-volatile data storage within a physical block.

In the example of FIG. 2, Leaf Node 1 216 corresponds to Segment 1 210, Leaf Node 2 222 corresponds to Segment 2 212, and so on through Leaf Node N 228, which corresponds to Segment N 214.

Each leaf node in the Leaf Level Nodes 201 contains pointers to pointers contained in one or more of the virtual blocks in the Virtual Block Layer 250. Virtual Block Layer 250 includes some number of virtual blocks, shown for purposes of illustration by Virtual Block 252, Virtual Block 254, and so on through Virtual Block 256. Physical Layer 270 includes some number of physical blocks, shown for purposes of illustration by Physical Block 272, Physical Block 274, and so on through Physical Block 276. Each physical block in Physical Layer 270 is a is a physically contiguous chunk of non-volatile data storage that may be used to store host data, and is made up of pages. For example, Physical Block 272 is made up of Pages 278, Physical Block 274 is made up of Pages 280, and so on through Physical Block 276, which is made up of Pages 282.

Each virtual block in Virtual Block Layer 250 corresponds to one of the physical blocks in Physical Layer 270. For example, Virtual Block 252 corresponds to Physical Block 272, Virtual Block 254 corresponds to Physical Block 274, and so on, through Virtual Block 256, which corresponds to Physical Block 276. In some embodiments, the pointers in a virtual block can only point to pages in the corresponding physical block. Accordingly, Pointers 258 in Virtual Block 252 can only point to Pages 278 in Physical Block 272, Pointers 260 in Virtual Block 254 can only point to Pages 280 in Physical Block 274, and so on, through Pointers 262 in Virtual Block 256, which can only point to Pages 282 in Physical Block 276. Each pointer in a virtual block points to a page of non-volatile storage that is used to store host data written to the segment or segments of the logical address space corresponding to one or more leaf nodes that include pointers to that pointer. Accordingly, Leaf Node 1 216 contains Pointers 218 that point to pointers in the virtual blocks of Virtual Block Layer 250 that point to pages in Physical Layer 270 that store host data indicated by Host Writes 202, because Host Writes 202 are directed to logical addresses (e.g. logical block addresses sometimes referred to as "LBAs") that fall within Segment 1 210. Leaf Node 2 222 contains Pointers 224 that point to pointers in the virtual blocks of Virtual Block Layer 250 that point to pages in Physical Layer 270 that store host data indicated by Host Writes 204, because Host Writes 204 are directed to logical addresses (e.g. "LBAs") that fall within Segment 2 212. The Leaf Level Nodes 201 continue on similarly through Leaf Node N 228, which contains Pointers 230 that point to pointers in the virtual blocks of Virtual Block Layer 250 that point to pages in Physical Layer 270 that store host data indicated by Host Writes 206, because Host Writes 206 are directed to logical addresses (e.g. "LBAs") that fall within Segment N 214.

The pointers in a given leaf node may be arranged sequentially, in correspondence with an order of LBAs within the corresponding segment of the logical address space. For example, a first pointer in Pointers 218 may point to a pointer to a page of non-volatile storage that is used to store the host data indicated by write operations directed to a first LBA within Segment 1 210 (e.g. the lowest LBA in the segment), a second pointer in Pointers 218 may point to a pointer to a page of non-volatile storage that is used to store the host data indicated by write operations directed to a second LBA within Segment 1 210 (e.g. the second lowest LBA in the segment), and so on.

Figure 3:
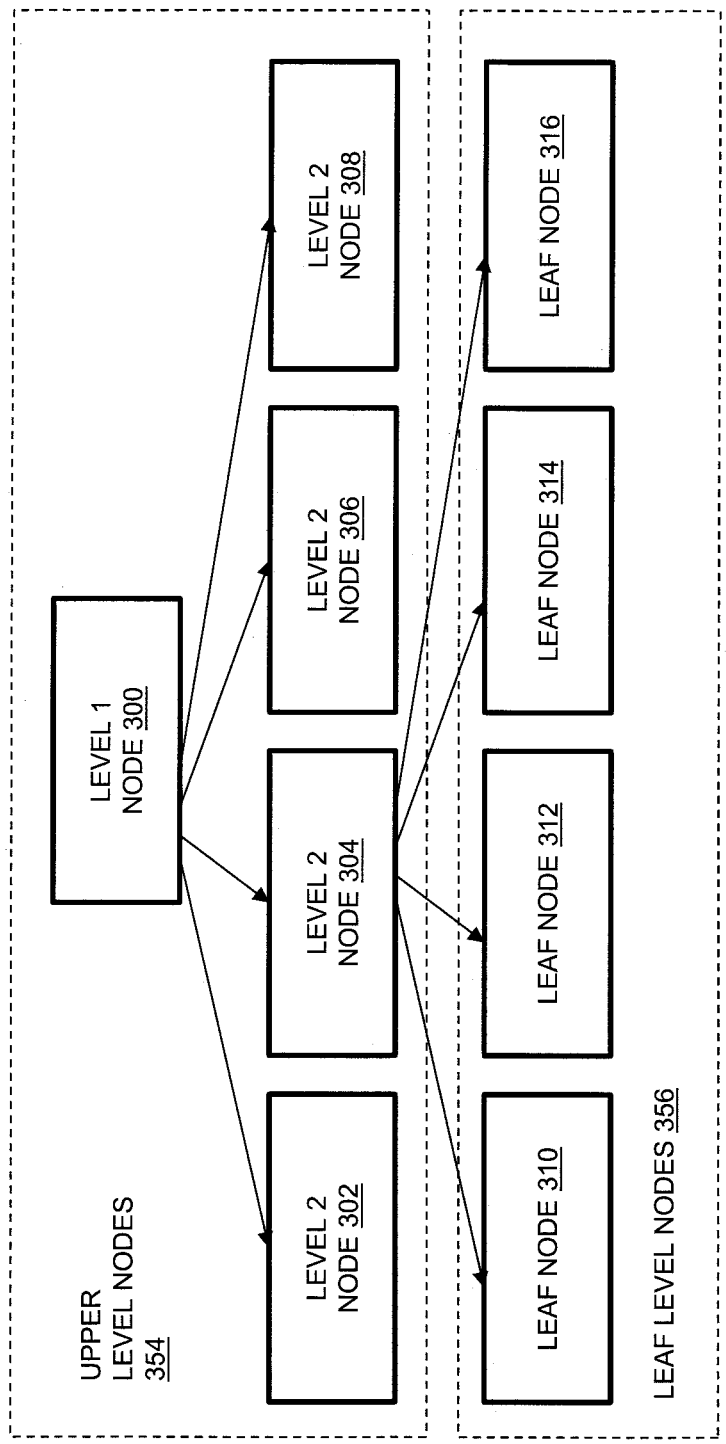
FIG. 3 is a block diagram showing a simplified example of some components in a mapper tree in some embodiments.

FIG. 3 is a block diagram showing a simplified example of a mapper tree in some embodiments. In the example of FIG. 3, the Upper Level Nodes 354 include two levels: a first level (also referred to as "level 1"), and a second level (also referred to as "level 2"). The first level is shown including a Level 1 Node 300. The second level is shown including Level 2 Node 302, Level 2 Node 304, Level 2 Node 306, and Level 2 Node 308. The Leaf Level Nodes 356 include Leaf Node 310, Leaf Node 312, Leaf Node 314, and Leaf Node 316.

In the example of FIG. 3, each level 1 node may contain pointers to a maximum of N level 2 nodes, each level 2 node may contain pointers to a maximum of N level 3 nodes.

Each leaf node in Leaf Level Nodes 356 contains pointers to pointers to pages of non-volatile storage. For example, each leaf node in Leaf Level Nodes 356 may contain a maximum of N pointers to pointers to pages of non-volatile storage used to store host data written to the segment of the logical address space corresponding to that leaf node.

Figure 4:
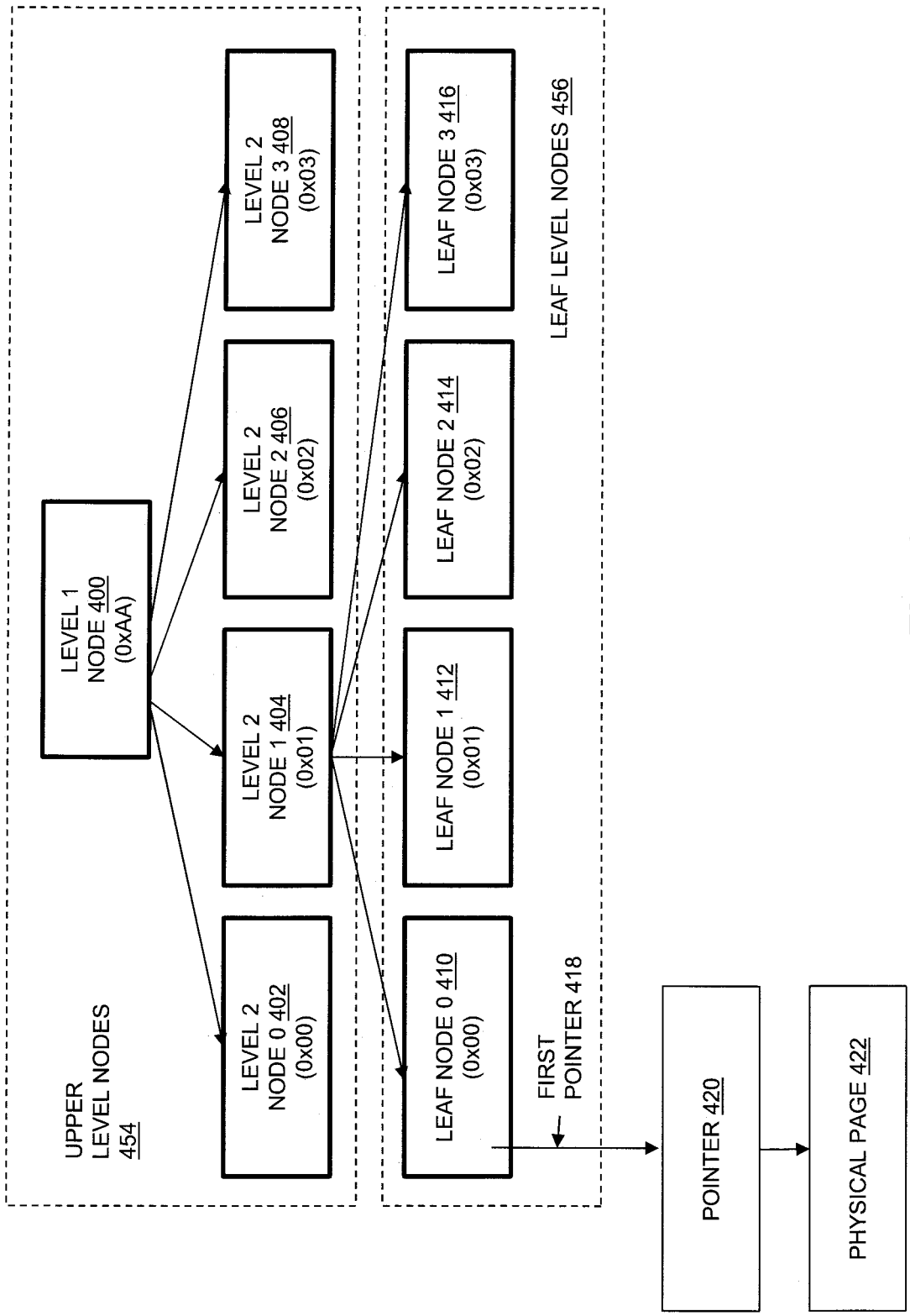
FIG. 4 is a block diagram showing another simplified example of some components in a mapper tree in some embodiments, and illustrating a traversal of the mapper tree to identify a physical page of non-volatile data storage.

FIG. 4 is a block diagram showing another simplified example of a mapper tree in some embodiments, and showing a traversal of the mapper tree to find a page of non-volatile storage. The Upper Level Nodes 454 in FIG. 4 include two levels: a first level (also referred to as "level 1"), and a second level (also referred to as "level 2"). The first level is shown including a Level 1 Node 400. The second level is shown including Level 2 Node 0 402, Level 2 Node 1 404, Level 2 Node 3 406, and Level 2 Node 4 408. The Leaf Level Nodes 456 include Leaf Node 0 410, Leaf Node 1 412, Leaf Node 2 414, and Leaf Node 3 416.

In the example of FIG. 4, each node may contain a maximum number N pointers to nodes in the next lower level, and N=256. Also in the example of FIG. 4, each LBA within the logical address space indicates a 4 KB block within the logical address space, and each page of non-volatile storage is 4 KB of non-volatile storage. Each pointer in a node within the Leaf Level Nodes 456 points to a pointer to a 4 KB page of non-volatile storage. Accordingly, in the example of FIG. 4, each leaf node in Leaf Level Nodes 456 may contain up to 256 pointers to pointers to 4 KB pages of non-volatile storage, and accordingly each leaf node in Leaf Level Nodes 456 corresponds to a 1 MB segment within the logical address space. Each level 2 node may contain up to 256 pointers to leaf nodes in the Leaf Level Nodes 456, and accordingly each level 2 node corresponds to 256 MB within the logical address space. Each level 1 node may contain up to 256 pointers to level 2 nodes, and accordingly each level 1 node corresponds to 64 GB within the logical address space.

Further with reference to the example of FIG. 4, the logical addresses within the logical address space to which individual write operations are directed are logical block addresses (LBAs). Each level 1 node is associated with a highest offset within the LBA, each level 2 node is associated with a second highest offset within the LBA, and each leaf node in the Leaf Level Nodes 456 is associated with a third highest offset within the LBA.

For example, in order to process a write operation directed to LBA 0xAA010000000 within the logical address space of the logical volume, a node in Level 1 is first visited that corresponds to the value of the highest offset within the LBA, e.g. a node in Level 1 that corresponds to 0xAA. In FIG. 1, Level 1 Node 400 corresponds to a highest offset value of 0xAA. In order to identify the next node to be visited during the traversal (i.e. the node within Level 2 to be visited after Level 1 Node 400), a pointer within Level 1 Node 400 is then located that corresponds to the value of the next highest offset within the LBA. In this example, the value of the next highest offset within the LBA is 0x01, and the pointer in Level 1 Node 400 is located that corresponds to 0x01, e.g. the pointer in the 0x01 position within the pointers contained in Level 1 Node 400, which is a pointer to Level 2 Node 1 404.

A pointer within Level 2 Node 1 404 is then located that corresponds to the value of the next highest offset within the LBA. In this example, the value of the next highest offset within the LBA is 0x00, and the pointer in Level 2 Node 404 is located that corresponds to 0x00, e.g. the pointer in the 0x00 position within the pointers contained in Level 2 Node 404, which is a pointer to Leaf Node 0 410.

A pointer within Leaf Node 0 410 is then located that corresponds to the value of the next highest offset within the LBA. In this example, the value of the next highest offset within the LBA is 0x00, and the pointer in Leaf Node 0 410 is located that corresponds to 0x00, e.g. a First Pointer 418 that is located within the 0x00 position within the pointers contained in Leaf Node 0 410. First Pointer 418 points to a Pointer 420. For example, Pointer 420 may be a pointer contained within the virtual block layer, e.g. Pointer 420 may be a pointer contained within one of the virtual blocks in the Virtual Block Layer 250 shown in FIG. 2. Pointer 420 points to a Physical Page 422 that is a page of non-volatile storage (e.g. a page within a physical block corresponding to the virtual block that contains Pointer 420), into which is stored the host data indicated by the write operation directed to LBA 0xAA010000000 within the logical address space of the logical volume.

While the above example describes processing of a write operation directed to an LBA of the logical volume in order to locate a corresponding physical page into which host data is to be stored, those skilled in the art will recognize that the mapper tree may be traversed similarly while processing a read operation directed to an LBA of the logical volume in order to locate a corresponding physical page from which host data is to be read.

Figure 5:
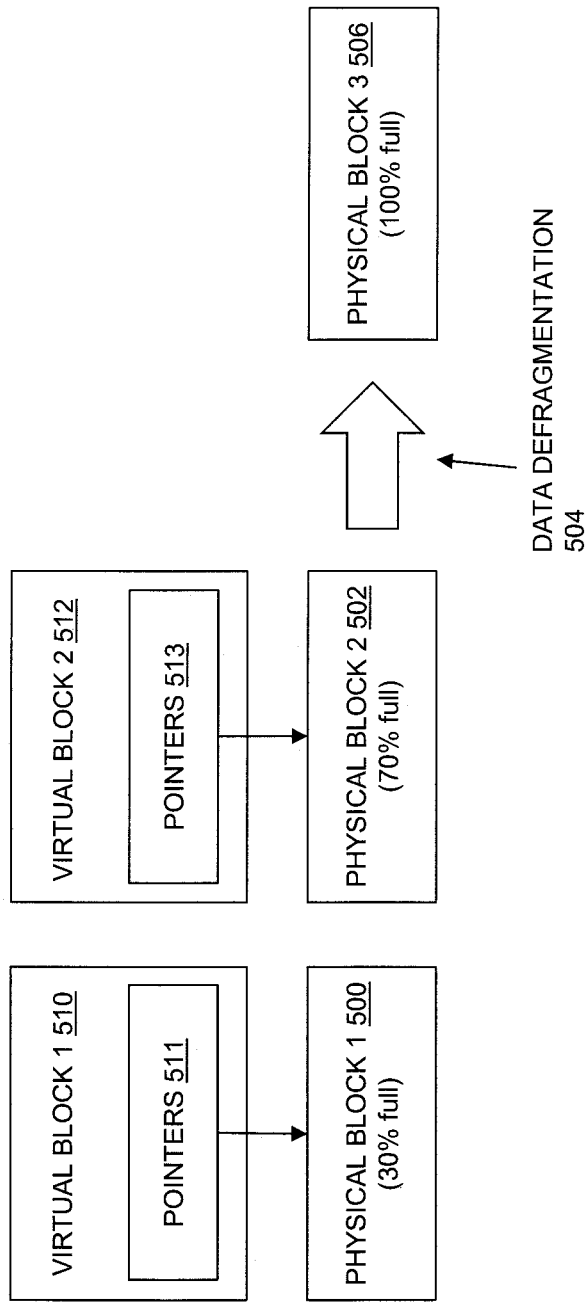
FIG. 5 is a block diagram showing an example of data defragmentation in some embodiments.

FIG. 5 is a block diagram showing an example of data defragmentation in some embodiments. In the example of FIG. 5, Physical Block 1 500 and Physical Block 2 502 have been identified, e.g. by Defragmentation Logic 154, as having significant amounts of free space. For example, Defragmentation Logic 154 may detect that Physical Block 1 500 is only 30% full of host data, and that Physical Block 2 502 is only 70% full of host data. In response to detecting that Physical Block 1 500 and Physical Block 2 502 have significant amounts of free space, the host data stored in Physical Block 1 500 and Physical Block 2 502 may be moved by Defragmentation Logic 154, e.g. at 504 in FIG. 5, from Physical Block 1 500 and Physical Block 2 502, into Physical Block 3 506. As a result of the Data Defragmentation 504 that moved the host data stored in Physical Block 1 500 and Physical Block 2 502 from Physical Block 1 500 and Physical Block 2 502 to Physical Block 3 506, Physical Block 3 506 becomes 100% full, and Physical Block 1 500 and Physical Block 2 502 become completely unused.

Further as a result of Data Defragmentation 504, Pointers 511 in Virtual Block 1 510 corresponding to Physical Block 1 500, that previously pointed to physical pages in Physical Block 1 500 storing host data, and Pointers 513 in Virtual Block 512 corresponding to Physical Block 2 502, that previously pointed to physical pages in Physical Block 2 502 storing host data, become invalid.

Figure 6:
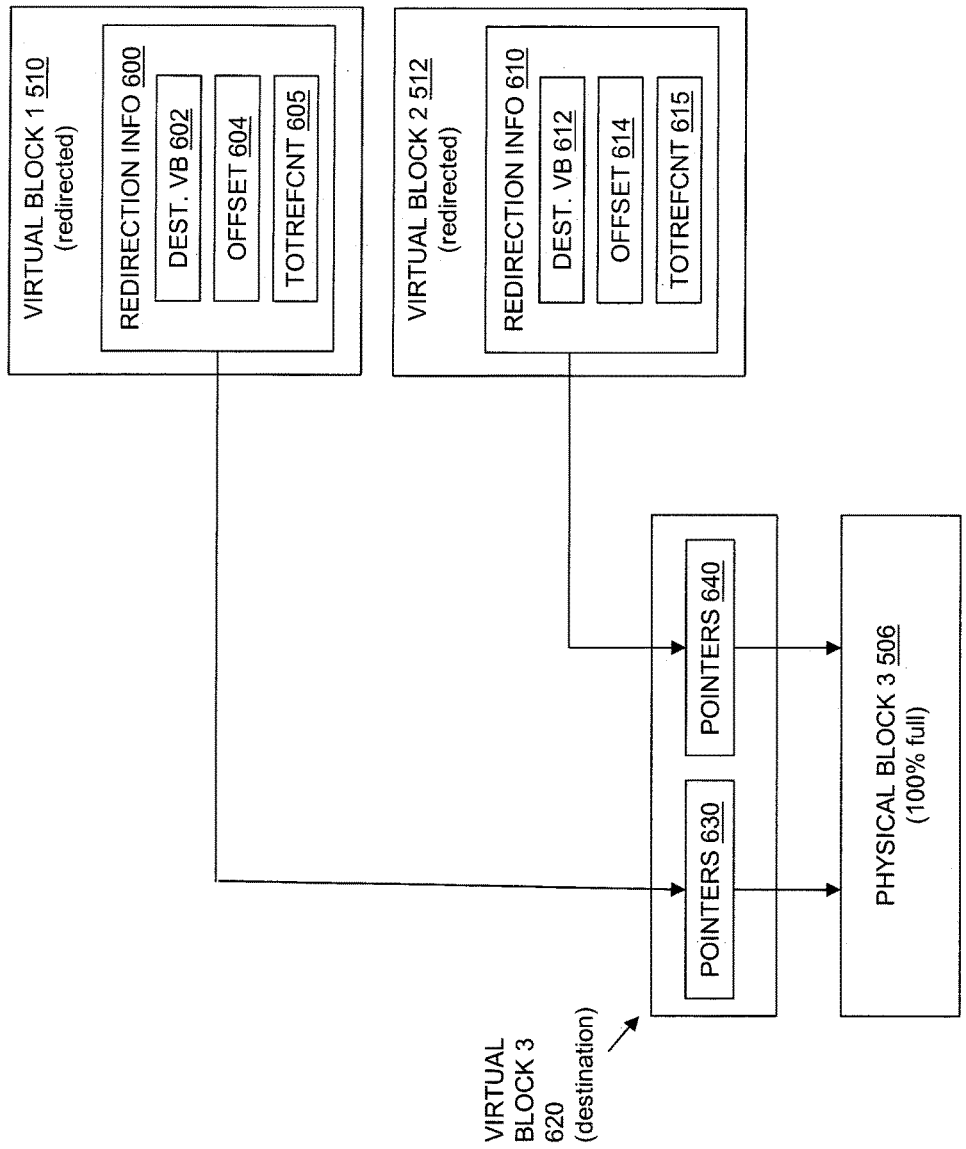
FIG. 6 is a block diagram showing an example of virtual block redirection performed in response to the data defragmentation shown in FIG. 5 in some embodiments.

As shown in FIG. 6, in response to and/or as part of Data Defragmentation 504, Redirection Logic 156 may redirect both Virtual Block 1 510 and Virtual Block 2 512 to a Virtual Block 3 620 that corresponds to Physical Block 3 506. Virtual Block 3 620 contains valid pointers, e.g. Pointers 630 and Pointers 640, to the host data in its new locations within Physical Block 3 506. Virtual Block 3 620 is the destination virtual block to which Virtual Block 1 510 and Virtual Block 2 512 are redirected. Redirection Logic 156 redirects Virtual Block 1 510 and Virtual Block 2 512 to Virtual Block 3 620 at least in part by storing Redirection Information 600 into Virtual Block 1 510, and storing Redirection Information 610 into Virtual Block 2 512. Redirection Information 600 and Redirection Information 610 are used when the mapper tree is subsequently traversed through leaf node pointers that still indicate the previously valid pointers in Virtual Block 1 510 and Virtual Block 2 512 that previously indicated the locations in Physical Block 1 500 and Physical Block 2 502 at which the host data was previously stored. The Redirection Information 600 and Redirection Information 610 identifies Virtual Block 3 620 as the destination virtual block for each of redirected Virtual Block 1 510 and redirected Virtual Block 2 512, and indicates locations within destination Virtual Block 3 620, e.g. offsets within Virtual Block 3 620, at which valid pointers are stored to the locations of the host data as it is now stored within Physical Block 3 506. Accordingly, the Redirection Information 600 stored in the redirected Virtual Block 1 510 and Redirection Information 610 stored in redirected Virtual Block 2 512 may each include i) an identifier of destination Virtual Block 3 620, and ii) an offset into destination Virtual Block 3 620 at which valid pointers are stored that point to physical pages in Physical Block 3 506 in which the host data is now stored after the defragmentation. For example, Redirection Information 600 that was stored into Virtual Block 1 510 when Virtual Block 1 510 is redirected to Virtual Block 3 620 may include an identifier of Virtual Block 3 620, as shown by Destination VB 602, and an offset into Virtual Block 3 620, as shown by Offset 604. Offset 604 indicates a location within Virtual Block 3 620 at which are located Pointers 630 to physical pages in Physical Block 3 506 that now store the host data that was previously stored in pages of the Physical Block 1 500. Similarly, Redirection Information 610 stored into Virtual Block 2 512 when Virtual Block 2 512 is redirected to Virtual Block 3 620 may include an identifier of Virtual Block 3 620, as shown by Destination VB 612, and an offset into Virtual Block 3 620, as shown by Offset 614. Offset 614 indicates a location within Virtual Block 3 620 at which are located Pointers 640 to physical pages in Physical Block 3 506 that now store the host data that was previously stored in pages of the Physical Block 2 502.

In some embodiments, Redirection Information 600 may include a total references counter for redirected Virtual Block 1 510, shown by TotRefCnt 605, and Redirection Information 610 may include a total references counter for redirected Virtual Block 2 512, shown by TotRefCnt 615. Further in response to redirection of Virtual Block 1 510 and Virtual Block 2 512, Redirection Logic 156 may create an initial value for the total references counters for redirected Virtual Block 1 510 and redirected Virtual Block 2 512 by adding the total number of dependent components in Dependent Components 160 to the total references counters for redirected Virtual Block 1 510 and redirected Virtual Block 2 512. For example, in the case where Dependent Components 160 is made up of ten components, then Redirection Logic 156 may add ten to the total references counters of Virtual Block 1 510 and Virtual Block 2 512 at the time Virtual Block 1 510 and Virtual Block 2 512 are redirected.

The total references counter in each redirected virtual block may then be subsequently decremented by Redirection Clean-Up Logic 158 at least in response to receipt of each acknowledgement to the redirection notification that was issued for that virtual block from a component in the Dependent Components 160. For example, the total references counter in Virtual Block 1 510 may be decremented in response to each acknowledgement received with regard to the redirection notification that was issued with respect to Virtual Block 1 510 at the time that Virtual Block 1 510 was redirected. Similarly, the total references counter in Virtual Block 2 512 may be decremented in response to each acknowledgement received with regard to the redirection notification that was issued with respect to Virtual Block 2 512 at the time that Virtual Block 2 512 was redirected.

Redirection Clean-Up Logic 158 may then determine that each dependent component in Dependent Components 160 has indicated that it does not store any pointer to any pointer located within a redirected virtual block when Redirection Clean-Up Logic 158 detects that the total references counter for the redirected virtual block has a value of zero. For example, Redirection Clean-Up Logic 158 may determine that each dependent component in Dependent Components 160 no longer stores any pointer to any pointer located in redirected Virtual Block 1 510 when the total references counter for redirected Virtual Block 1 510 has a value of zero. Similarly, Redirection Clean-Up Logic 158 may determine that each dependent component in Dependent Components 160 no longer stores any pointer to any pointer located in redirected Virtual Block 2 512 when the total references counter for redirected Virtual Block 2 512 has a value of zero.

In some embodiments, further in response to the redirection of a virtual block, Redirection Logic 156 may also add a total number of pointers stored in leaf nodes that point to pointers located within the redirected virtual block to the total references counter for the virtual block. For example, each virtual block may contain an independent reference count for each one of the pointers it contains, storing the total number of pointers in leaf nodes that point to the corresponding pointer, and the total number of pointers stored in leaf nodes that point to pointers located within a given redirected virtual block at the time the virtual block is redirected may be calculated by summing, at the time the virtual block is redirected, all the reference counts for all the pointers located in the virtual block. The initial value that the total references counter for a redirected virtual block is set to at the time the virtual block is redirected may be the sum of i) the total number of pointers stored in leaf nodes that point to pointers located within the redirected virtual block, and ii) the total number of dependent components in the set of dependent components. For example, Redirection Logic 156 may calculate an initial value for the total references counter for redirected Virtual Block 1 510 at the time that Virtual Block 510 is redirected by adding i) the total number of pointers stored in leaf nodes that point to pointers located in Virtual Block 1 510, to ii) the total number of dependent components in the set of dependent components. Similarly, Redirection Logic 156 may calculate an initial value for the total references counter for redirected Virtual Block 2 512 at the time that Virtual Block 2 512 is redirected by adding i) the total number of pointers stored in leaf nodes that point to pointers located in Virtual Block 2 512, to ii) the total number of dependent components in the set of dependent components.

The total references counter for each redirected virtual block may then also be decremented (e.g. by Redirection Clean-Up Logic 158) each time a pointer in a leaf node of the mapper tree that points to a pointer located within the redirected virtual block is replaced with a pointer to a pointer located within the destination virtual block. For example, the total references counter for redirected Virtual Block 1 510 may be decremented each time a pointer in a leaf node that points to a pointer located within redirected Virtual Block 1 510 is replaced with a pointer to a pointer that is located in destination Virtual Block 3 620. Similarly, the total references counter for redirected Virtual Block 2 512 may be decremented each time a pointer in a leaf node that points to a pointer located within redirected Virtual Block 2 512 is replaced with a pointer to a pointer that is located in destination Virtual Block 3 620.

In some embodiments, a redirected virtual block may be cleaned up by Redirection Clean-Up Logic 158 (e.g. by deleting the redirection information stored in the redirected virtual block) responsive at least in part to a determination that the total references counter for the redirected virtual block has been decremented from the initial value to which it was set when the virtual block was redirected down to a value of zero. In embodiments in which the initial value of the total references counter for a redirected virtual block is equal to the sum of i) the total number of pointers stored in leaf nodes that point to pointers located within the redirected virtual block, and ii) the total number of dependent components in the set of dependent components, detecting that the total references counter for the redirected virtual block has been decremented down from the initial value to zero indicates that i) no leaf nodes contain any pointers to any pointers in the redirected virtual block, and ii) no dependent components store any pointers to any pointers in the redirected virtual block.

For example, redirected Virtual Block 1 510 may be cleaned up (e.g. by deleting Redirection Information 600) responsive at least in part to a determination that the total references counter for redirected Virtual Block 1 510 has been decremented from the initial value to which it was set when Virtual Block 1 510 was redirected down to a value of zero. Similarly, redirected Virtual Block 2 512 may be cleaned up (e.g. by deleting Redirection Information 610) responsive at least in part to a determination that the total references counter for redirected Virtual Block 2 512 has been decremented from the initial value to which it was set when Virtual Block 2 512 was redirected down to a value of zero.

Those skilled in the art will recognize that while the example of FIG. 6 shows a single level of redirection, the disclosed technology is not limited to embodiments that have only one level of redirection. Accordingly, the disclosed technology may be embodied such that multiple redirections may be chained together, e.g. Virtual Block 3 620 may itself be redirected to another destination virtual block, even while Virtual Block 1 510 and Virtual Block 2 512 remain redirected to Virtual Block 3 620, and additional further redirections may also be provided as may be appropriate for some embodiments under some operational conditions.

Figure 7:
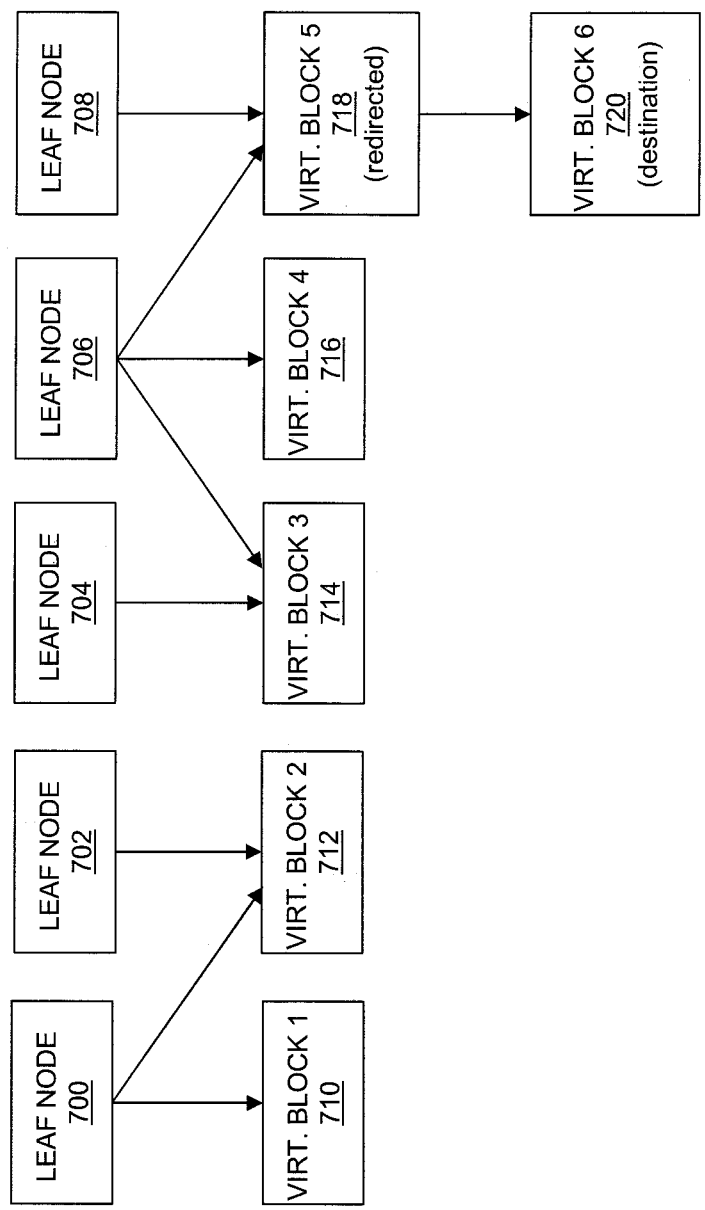
FIG. 7 is a block diagram showing a portion of a mapper tree in which a virtual block has been redirected in some embodiments.

FIG. 7 is a block diagram showing an example of a portion of a mapper tree in which a virtual block has been redirected in some embodiments. As shown in the example of FIG. 7, Leaf Node 700 includes a pointer to a pointer located in Virtual Block 1 710 and a pointer to a pointer located in Virtual Block 2 712, Leaf Node 702 includes a pointer to a pointer located in Virtual Block 2, Leaf Node 704 includes a pointer to a pointer located in Virtual Block 3 714, Leaf Node 706 includes a pointer to a pointer located in Virtual Block 3 714, a pointer to a pointer located in Virtual Block 4 716, and a pointer to a pointer located in Virtual Block 5 718, and Leaf Node 708 includes a pointer to a pointer located in Virtual Block 5 718. Virtual Block 5 718 has been redirected to the destination Virtual Block 6 720, and accordingly includes redirection information indicating the destination Virtual Block 6 720.

Figure 8:
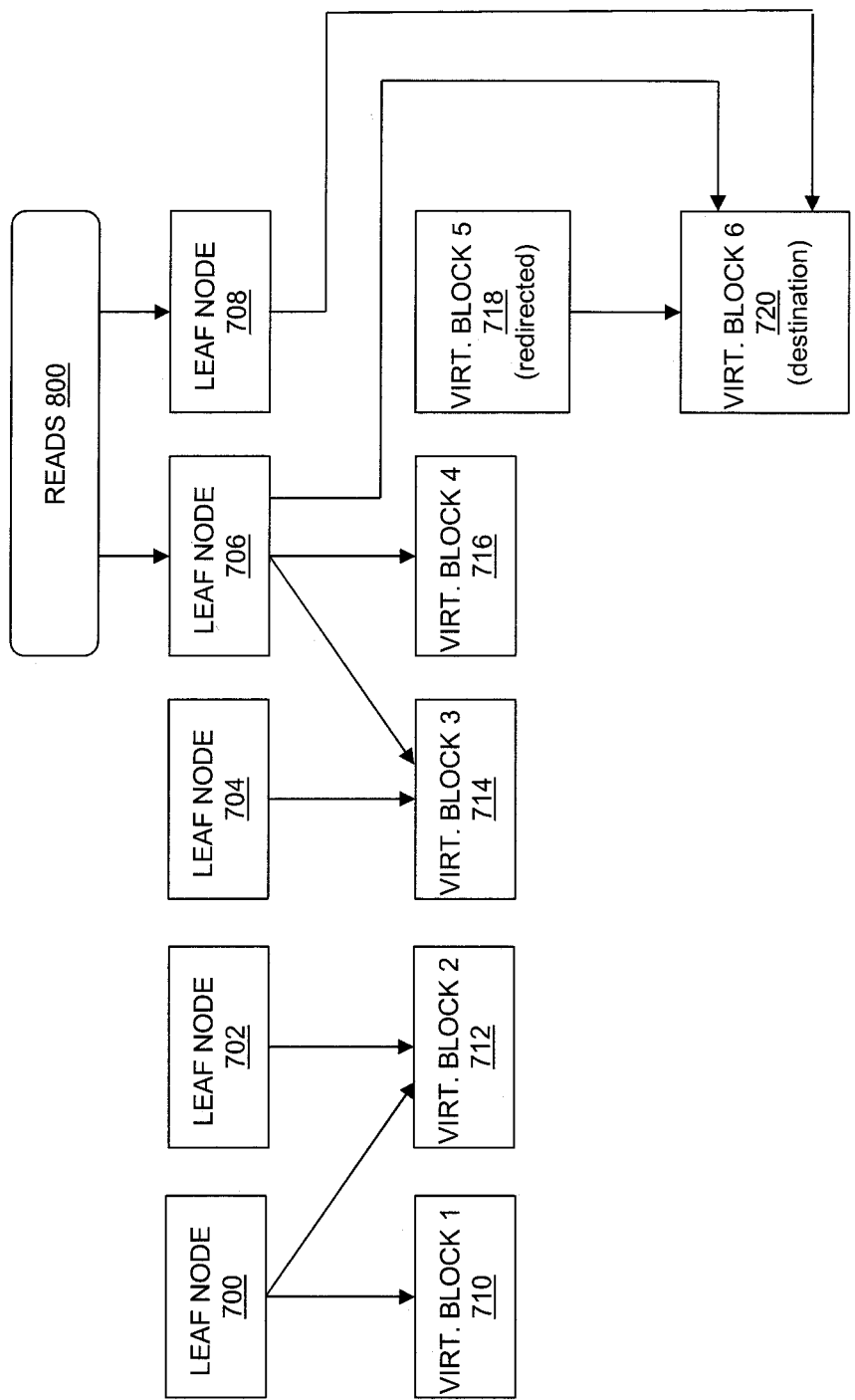
FIG. 8 is a block diagram showing the portion of the mapper tree shown in FIG. 7, after pointers in leaf nodes pointing to pointers in the redirected virtual block have been replaced by pointers to pointers in the destination virtual block in response to read operations.

FIG. 8 is a block diagram showing the portion of the mapper tree shown in FIG. 7, after the pointer in Leaf Node 706 that pointed to a pointer in redirected Virtual Block 5 718 has been replaced with a pointer to a pointer located in destination Virtual Block 6 720, and after the pointer in Leaf Node 708 that pointed to a pointer located in redirected Virtual Block 5 718 has been replaced with a pointer to a pointer located in destination Virtual Block 6 720. In the example of FIG. 8, the pointers to pointers in redirected Virtual Block 5 718 are replaced (e.g. by Redirection Clean-Up Logic 158) while Host I/O Processing Logic 140 traverses the mapper tree to process Reads 800 of the logical volume. For example, while traversing the mapper tree to process a read of the logical volume that requires traversing the pointer in Leaf Node 706 that points to redirected Virtual Block 5 718, the pointer in Leaf Node 706 that points to redirected Virtual Block 5 718 may be replaced with a pointer to a pointer in destination Virtual Block 6 720. The total references counter in redirected Virtual Block 5 718 may then be decremented. Similarly, while traversing the mapper tree to process a read of the logical volume that requires traversing the pointer in Leaf Node 708 that points to redirected Virtual Block 5 718, the pointer in Leaf Node 708 that points to redirected Virtual Block 5 718 may be replaced with a pointer to a pointer in destination Virtual Block 6 720. The total references counter in redirected Virtual Block 5 718 may then again be decremented.

Figure 9:
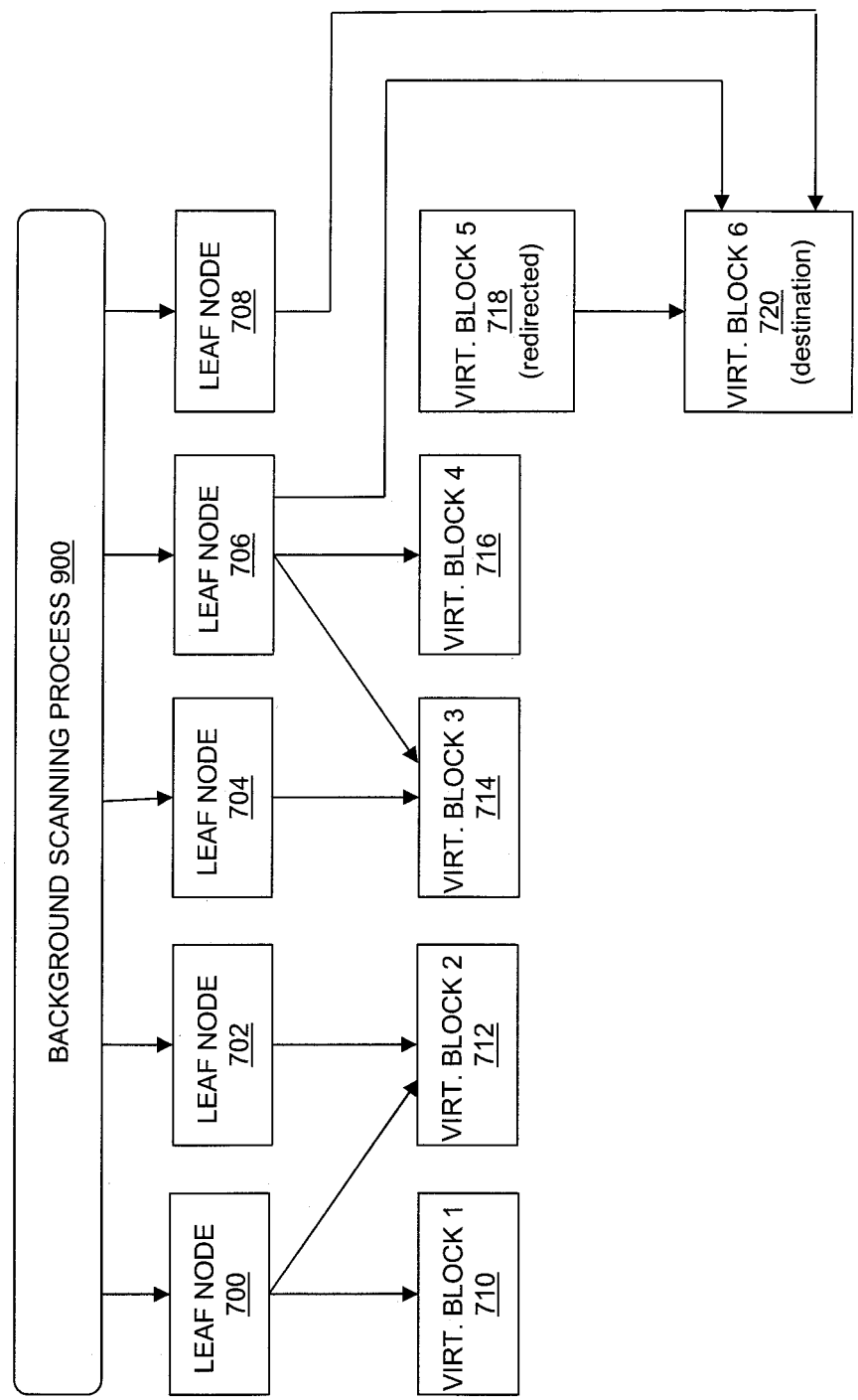
FIG. 9 is a block diagram showing the portion of the mapper tree shown in FIG. 7, after pointers in leaf nodes pointing to pointers in the redirected virtual block have been replaced by pointers to pointers in the destination virtual block in response to a background scanning process.

FIG. 9 is a block diagram showing the portion of the mapper tree shown in FIG. 7, after pointers in leaf nodes pointing to pointers in the redirected virtual block have been replaced by pointers to pointers in the destination virtual block by a Background Scanning Process 900, e.g. a process within Redirection Clean-Up Logic 158 that executes in the background at a relatively low priority as execution resources (e.g. Processing Circuitry 124) become available within Storage Processor 120. Background Process 900 may operate by continuously checking the leaf nodes in the mapper tree for pointers to pointers in virtual blocks that have been redirected. In response to detecting that Leaf Node 706 contains a pointer to a pointer in the redirected Virtual Block 5 718, the Background Process 900 replaces the pointer in Leaf Node 706 that points to the pointer in the redirected Virtual Block 5 718 with a pointer to a pointer in Virtual Block 6 720. The total references counter for redirected Virtual Block 5 718 is then decremented. Similarly, in response to detecting that Leaf Node 708 contains a pointer to a pointer in the redirected Virtual Block 5 718, the Background Process 900 replaces the pointer in Leaf Node 708 that points to the pointer in the redirected Virtual Block 5 718 with a pointer to a pointer in Virtual Block 6 720. The total references counter for redirected Virtual Block 5 718 is then again decremented.

In some embodiments, pointers in leaf nodes that point to pointers located in redirected virtual blocks may be replaced with pointers to pointers located in destination virtual blocks both while processing reads of the logical volume, as described above with reference to FIG. 8, and also by operation of a background scanning process, as described above with reference to FIG. 9.

Figure 10:
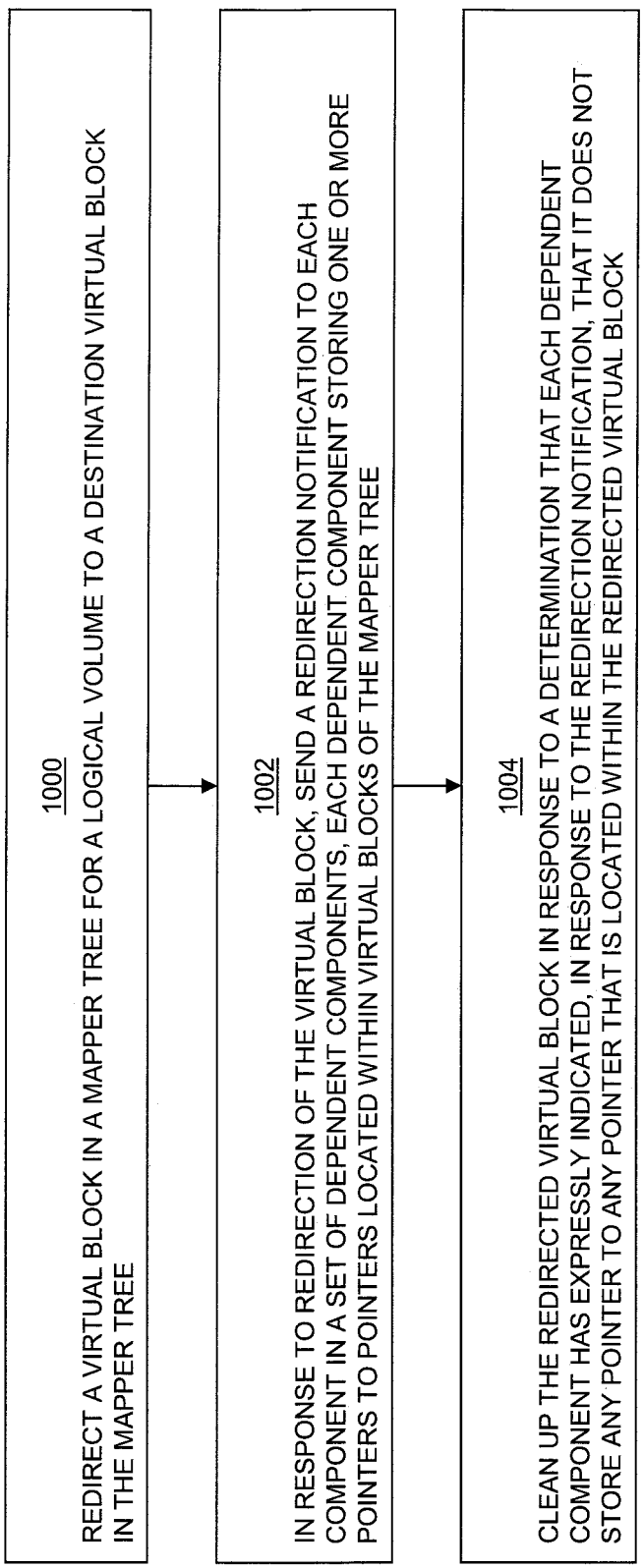
FIG. 10 is a flow chart showing an example of steps that may be performed in some embodiments.

FIG. 10 is a flow chart showing an example of steps that may be performed in some embodiments.

At step 1000, a virtual block in a mapper tree for a logical volume is redirected to a destination virtual block in the mapper tree.

At step 1002, in response to redirection of the virtual block, a redirection notification is sent to each component in a set of dependent components. Each dependent component in the set of dependent components may store one or more pointers to pointers located within virtual blocks of the mapper tree.

At step 1004, the redirected virtual block is cleaned up in response to a determination that each dependent component has expressly indicated, in response to the redirection notification, that it does not store any pointer to any pointer that is located within the redirected virtual block.

As will be appreciated by those skilled in the art, the technologies disclosed herein may be embodied as a system, method or computer program product. Accordingly, each specific feature of the present disclosure may be embodied using hardware, software (including firmware, resident software, micro-code, etc.) or a combination of software and hardware. Furthermore, the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art will readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media.

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
    redirecting a virtual block in a mapper tree for a logical volume to a destination virtual block in the mapper tree;
    in response to redirecting the virtual block, sending a redirection notification to each component in a set of dependent components, wherein each dependent component stores one or more pointers to pointers located within virtual blocks of the mapper tree; and
    cleaning up the redirected virtual block in response to determining that each dependent component has expressly indicated, in response to the redirection notification, that it does not store any pointer to any pointer that is located within the redirected virtual block.

2. The method of claim 1, wherein the redirection notification identifies both the redirected virtual block and the destination virtual block; and
    wherein receipt of the redirection notification by each dependent component causes the dependent component to replace at least one previously stored pointer to a pointer located within the redirected virtual block with a pointer to a pointer located within the destination virtual block.

3. The method of claim 2, wherein determining that each dependent component has indicated that it does not store any pointer to any pointer located within the redirected virtual block comprises receiving an acknowledgement to the redirection notification from each dependent component indicating that the dependent component has replaced all pointers to pointers located within the redirected virtual block that were previously stored by the dependent component with pointers to pointers located within the destination virtual block.

4. The method of claim 3, further comprising:
    in response to redirection of the virtual block, adding a total number of dependent components in the set of dependent components to a total references counter for the redirected virtual block; and
    decrementing the total references counter at least in response to receipt of each acknowledgement to the redirection notification; and
    wherein determining that each dependent component has indicated that it does not store any pointer to any pointer located within the redirected virtual block comprises detecting that the total references counter for the redirected virtual block has a value of zero.

5. The method of claim 4, further comprising:
    adding a total number of pointers stored in leaf nodes of the mapper tree that point to pointers located within the redirected virtual block to the total references counter for the virtual block; and
    decrementing the total references counter for the virtual block each time a pointer in a leaf node of the mapper tree that points to a pointer that is located within the redirected virtual block is replaced with a pointer to a pointer that is located within the destination virtual block.

6. The method of claim 5, further comprising replacing pointers in leaf nodes of the mapper tree that point to pointers located within the redirected virtual block with pointers to pointers located within the destination virtual block while traversing the mapper tree to process reads of the logical volume.

7. The method of claim 6, further comprising replacing pointers in leaf nodes of the mapper tree that point to pointers located within the redirected virtual block with pointers to pointers located within the destination virtual block in a background process.

8. The method of claim 3, further comprising:
    in response to redirection of the virtual block, setting all bits in a bit map, wherein the bit map includes a bit corresponding to each one of the dependent components in the set of dependent components; and
    clearing a bit in the bit map corresponding to one of the dependent components in the set of dependent components in response to receipt of an acknowledgement to the redirection notification from that dependent component; and
    wherein determining that each dependent component has indicated that it does not store any pointer to any pointer located within the redirected virtual block comprises detecting that all bits in the bit map have been cleared.

9. The method of claim 1, wherein redirecting the virtual block comprises adding redirection information to the virtual block indicating the destination virtual block; and
    wherein cleaning up the redirected virtual block comprises deleting the redirection information from the redirected virtual block.

10. The method of claim 9, wherein the redirection information further comprises an offset into the destination virtual block at which are stored, within the destination virtual block, a plurality of pointers to pages located in a physical block corresponding to the destination virtual block, wherein the pages located in the physical block corresponding to the destination virtual block store host data that was previously moved from physical pages located in a physical block corresponding to the redirected virtual block.

11. The method of claim 1, wherein the virtual block is redirected in response to moving host data from at least one page in a physical block corresponding to the redirected virtual block to at least one page in a physical block corresponding to the destination virtual block by a defragmentation component.

12. A data storage system, comprising:
    processing circuitry and memory coupled to the processing circuitry, the memory storing instructions, wherein the instructions, when executed by the processing circuitry, cause the processing circuitry to:
        redirect a virtual block in a mapper tree for a logical volume to a destination virtual block in the mapper tree;
        in response to redirecting the virtual block, send a redirection notification to each component in a set of dependent components, wherein each dependent component stores one or more pointers to pointers located within virtual blocks of the mapper tree; and
        clean up the redirected virtual block in response to determining that each dependent component has expressly indicated, in response to the redirection notification, that it does not store any pointer to any pointer that is located within the redirected virtual block.

13. The data storage system of claim 12, wherein the redirection notification identifies both the redirected virtual block and the destination virtual block; and
    wherein receipt of the redirection notification by each dependent component causes the dependent component to replace at least one previously stored pointer to a pointer located within the redirected virtual block with a pointer to a pointer located within the destination virtual block.

14. The data storage system of claim 13, wherein the instructions, when executed by the processing circuitry, further cause the processing circuitry to:
    determine that each dependent component has indicated that it does not store any pointer to any pointer located within the redirected virtual block at least in part by receipt of an acknowledgement to the redirection notification from each dependent component indicating that the dependent component has replaced all pointers to pointers located within the redirected virtual block that were previously stored by the dependent component with pointers to pointers located within the destination virtual block.

15. The data storage system of claim 14, wherein the instructions, when executed by the processing circuitry, further cause the processing circuitry to:
    in response to redirection of the virtual block, add a total number of dependent components in the set of dependent components to a total references counter for the redirected virtual block; and
    decrement the total references counter at least in response to receipt of each acknowledgement to the redirection notification; and
    determine that each dependent component has indicated that it does not store any pointer to any pointer located within the redirected virtual block at least in part by detecting that the total references counter for the redirected virtual block has a value of zero.

16. The data storage system of claim 15, wherein the instructions, when executed by the processing circuitry, further cause the processing circuitry to:
    add a total number of pointers stored in leaf nodes of the mapper tree that point to pointers located within the redirected virtual block to the total references counter for the virtual block; and
    decrement the total references counter for the virtual block each time a pointer in a leaf node of the mapper tree that points to a pointer that is located within the redirected virtual block is replaced with a pointer to a pointer that is located within the destination virtual block.

17. The data storage system of claim 16, wherein the instructions, when executed by the processing circuitry, further cause the processing circuitry to:
    replace pointers in leaf nodes of the mapper tree that point to pointers located within the redirected virtual block with pointers to pointers located within the destination virtual block while traversing the mapper tree to process reads of the logical volume; and
    replace pointers in leaf nodes of the mapper tree that point to pointers located within the redirected virtual block with pointers to pointers located within the destination virtual block in a background process.

18. The data storage system of claim 12, wherein the instructions, when executed by the processing circuitry, further cause the processing circuitry to:
    redirect the virtual block at least in part by addition of redirection information to the virtual block indicating the destination virtual block; and
    clean up the redirected virtual block at least in part by deletion of the redirection information from the redirected virtual block.

19. The data storage system of claim 18, wherein the redirection information further comprises an offset into the destination virtual block at which are stored, within the destination virtual block, a plurality of pointers to pages located in a physical block corresponding to the destination virtual block, wherein the pages located in the physical block corresponding to the destination virtual block store host data that was previously moved from physical pages located in a physical block corresponding to the redirected virtual block.

20. A computer program product, comprising:
    a non-transitory, computer-readable medium having instructions stored thereon that, when executed by processing circuitry in a data storage system, cause the processing circuitry to perform a method comprising the steps of:
        redirecting a virtual block in a mapper tree for a logical volume to a destination virtual block in the mapper tree;
        in response to redirecting the virtual block, sending a redirection notification to each component in a set of dependent components, wherein each dependent component stores one or more pointers to pointers located within virtual blocks of the mapper tree; and
        cleaning up the redirected virtual block in response to determining that each dependent component has expressly indicated, in response to the redirection notification, that it does not store any pointer to any pointer that is located within the redirected virtual block.

* * * * *